Sept. 17, 1968     T. F. BRIGHT     3,402,251

ELECTRICAL ACCORDION-ORGAN

Filed June 30, 1965     8 Sheets-Sheet 1

THOMAS F. BRIGHT
INVENTOR

BY Ralph E. Bitner
ATTORNEY

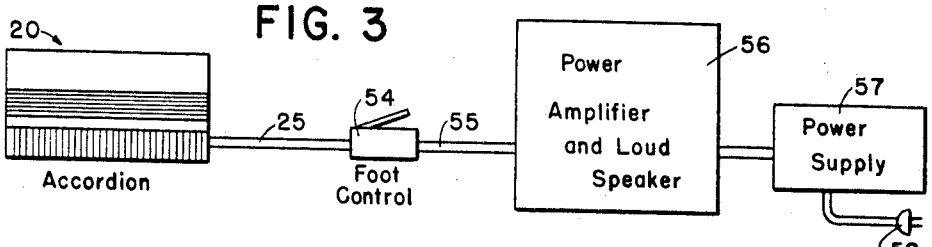
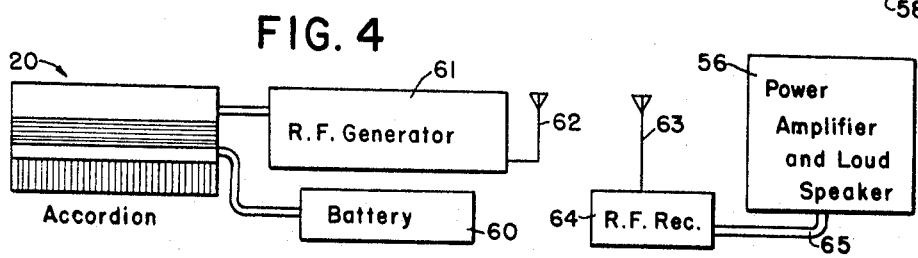
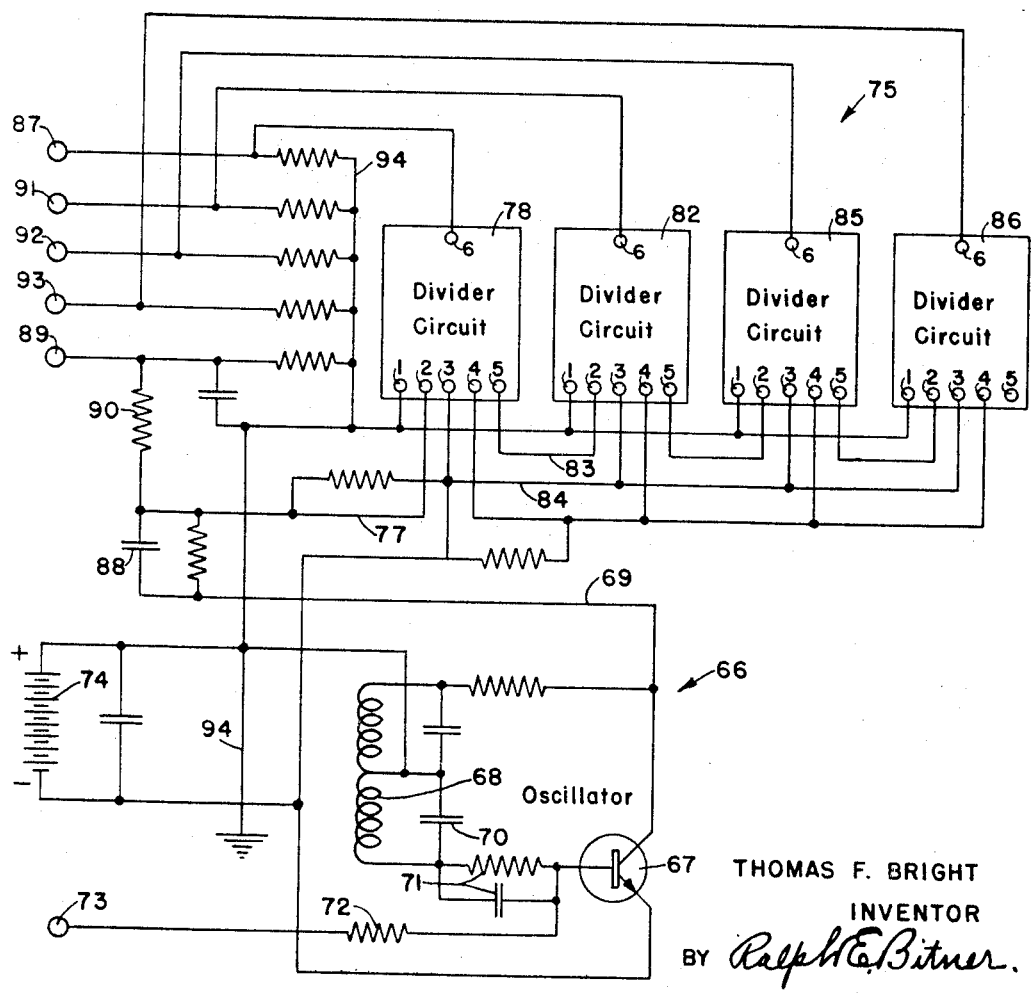

Sept. 17, 1968   T. F. BRIGHT   3,402,251
ELECTRICAL ACCORDION-ORGAN
Filed June 30, 1965   8 Sheets-Sheet 3
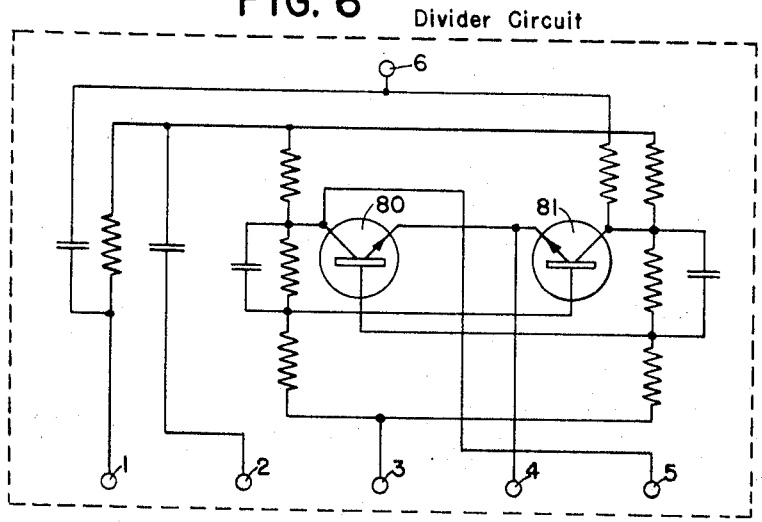
FIG. 6  Divider Circuit
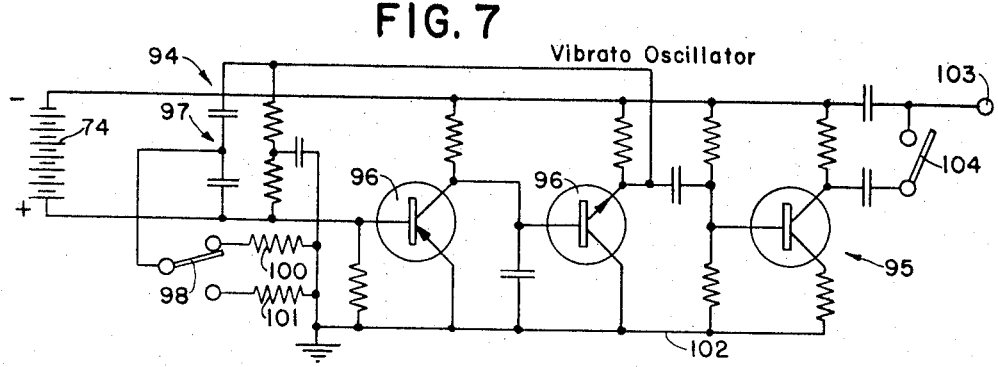
FIG. 7  Vibrato Oscillator
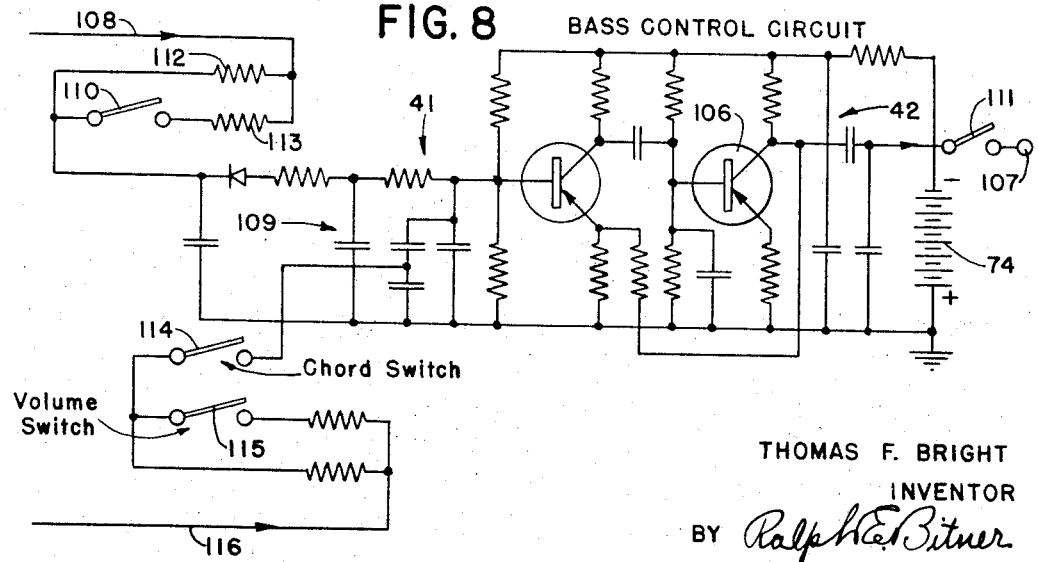
FIG. 8  BASS CONTROL CIRCUIT
THOMAS F. BRIGHT
INVENTOR
BY Ralph E. Bitner
ATTORNEY

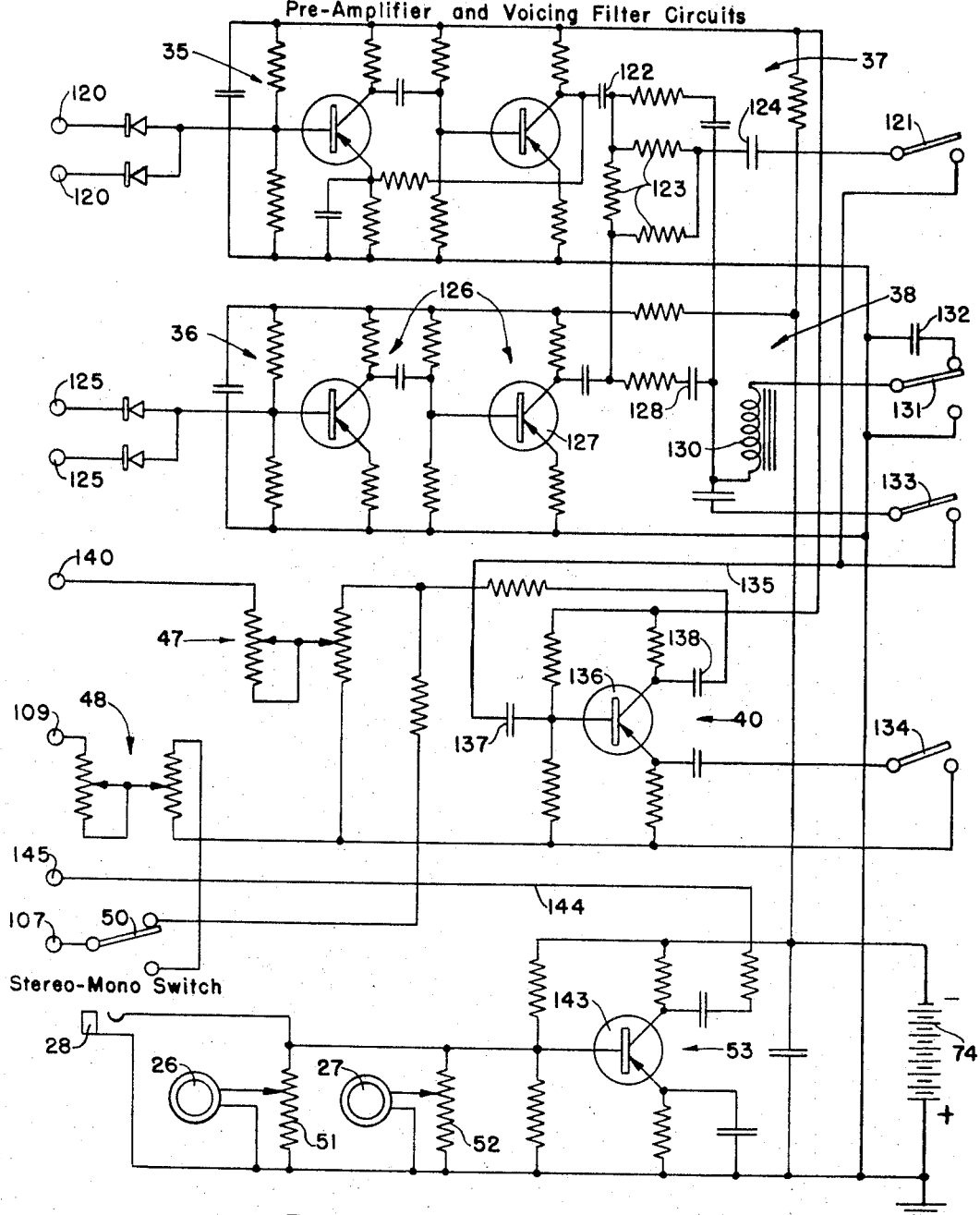

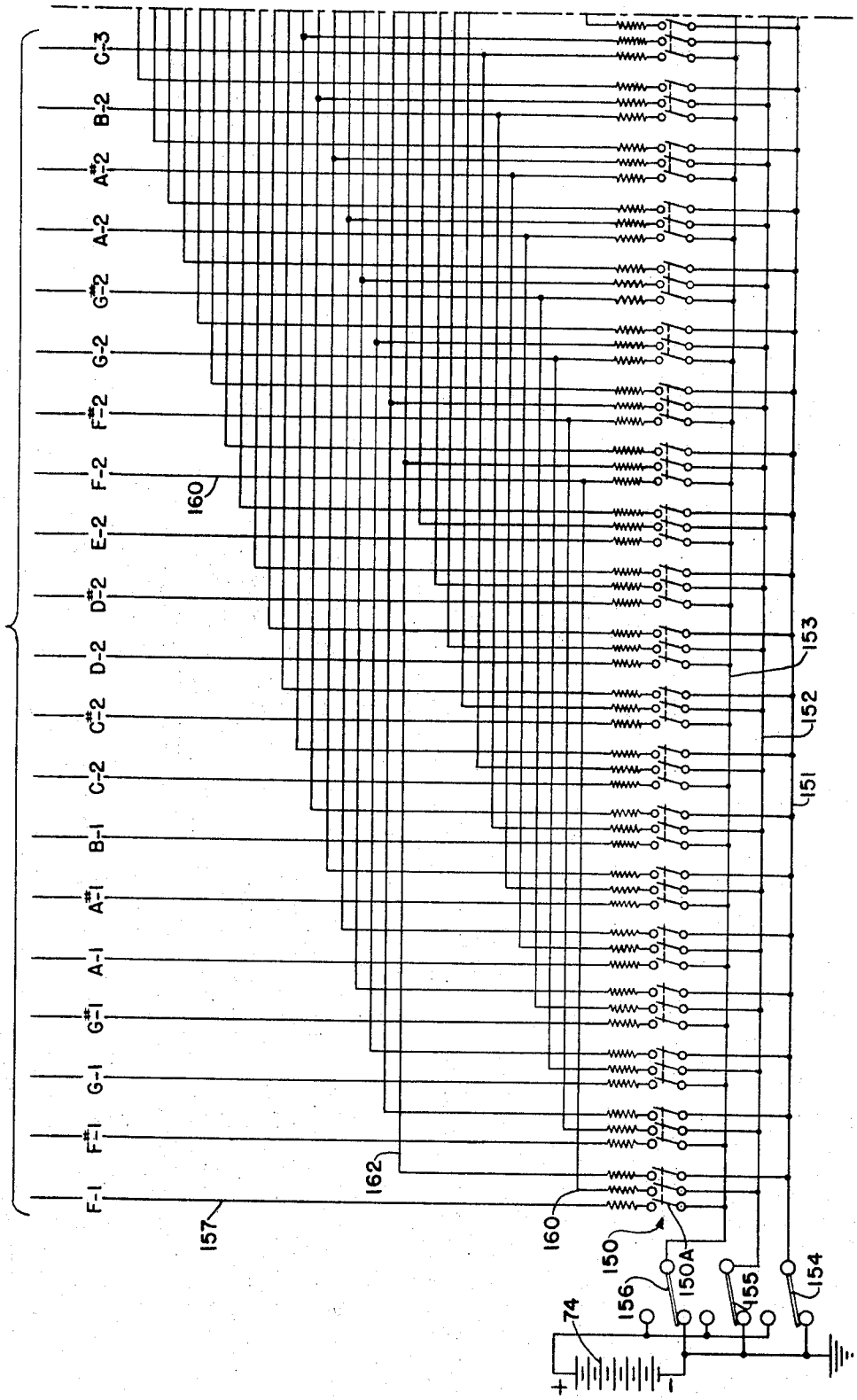

Sept. 17, 1968      T. F. BRIGHT      3,402,251

ELECTRICAL ACCORDION-ORGAN

Filed June 30, 1965      8 Sheets—Sheet 8

3,402,251  
ELECTRICAL ACCORDION-ORGAN  
Thomas F. Bright, Bergenfield, N.J., assignor to Bergen Laboratories, Inc., Paterson, N.J., a corporation of New Jersey  
Filed June 30, 1965, Ser. No. 468,527  
9 Claims. (Cl. 84—1.13)

ABSTRACT OF THE DISCLOSURE

An accordion-organ combination which can be played as a reed instrument using the bellows, as an electronic organ using electric oscillators, or as a combination of both. The electric circuits include frequency dividers, tonal filters for simulating other instruments, a vibrato oscillator for producing a low frequency modulation, and a sustain circuit for causing the sound to decay in a natural manner after the key switch has been opened.

---

This invention relates to an improved accordion-organ combination having many advantages over the usual reed-type accordion. It has particular reference to the combination of switching means for producing chords and to a circuit which causes a played note or chord to die out in a natural manner after an activating switch has been opened.

Several attempts have been made to combine the usual type of reed accordion with electrical oscillators, divider circuits, filters, and a loud speaker type of transducer. These prior attempts have not been too successful because the electrical circuits were not capable of producing all the tonal variations generally available in a reed-type organ. Also, the resulting instrument was heavy, bulky, and more difficult to operate. The accordion-organ combination herein described is no larger than the usual accordion. It can be played as a reed-type instrument using the bellows as a source of air pressure. It can also be operated as an electrical organ without using the bellows but employing an electrical power supply and one or more loud speaking transducers. In addition, a microphone is available to the operator for announcements or for singing. Many other novel features are built into the present instrument which will be described in detail later.

One of the objects of this invention is to provide accordion-electrical organ combination which avoids one or more of the disadvantages and limitations of prior art instruments.

Another object of the invention is to provide an entire electrical organ positioned within a working accordion.

Another object of the invention is to provide electrical organ circuits which are controlled by the keys operated by both the right and left hands. These circuits may be operated alone or in any combination.

Another object of the invention is to provide a vibrato oscillator which produces a modulating tone applicable to any tone or chord output.

Another object of the invention is to provide a stereo system for separating the notes controlled by the left hand from the notes controlled by the right hand.

Another object of the invention is to control the voicing of the output notes by selected filter circuits so that a large number of tonal qualities are available to the player.

Another object of the invention is to provide a microphone in the accordion case where it is always available to the operator for announcing or singing.

Another object of the invention is to sustain a played note for a short time interval after the activating key has been released by the operator. By the use of a novel circuit arrangement the note dies out in the same manner as a note produced by a reed instrument.

Still another object of the invention is to generate a high frequency radio wave and modulate this wave by the note frequencies produced by the organ. The radio wave is then applied to a small antenna and received by a stationary radio receiving set.

The invention comprises an electrical musical instrument in combination with a reed-type accordion for producing electrical frequencies corresponding to all the notes produced by the reed instrument. A plurality of electrical oscillators produce all the frequencies necessary for the highest octave. Divider circuits connected to the oscillators produce all the other frequencies needed for a full range accordion. A right hand keyboard and a left hand keyboard contain keys which operate switches for switching frequencies from the oscillators and divider circuits to a loud speaker transducer. A plurality of filter circuits are coupled between the keyboard switches and the loud speakers for producing a wide range of tonal variations.

One feature of the invention includes the use of a modulation oscillator which is coupled to the tone generators to provide a vibrato effect.

Another feature of the invention includes the use of a plurality of sustain circuits coupled to each keyboard switch and providing a predetermined volume decay of the tone output.

Still another feature of the invention includes the use of a radio broadcast circuit to transmit the generated frequencies through space to a stationary radio receiving circuit.

For a better understanding of the present invention, together with other and further objects thereof, reference is made to the following description taken in connection with the accompanying drawings.

FIG. 3 is a schematic diagram showing the relationship of the accordion, the amplifiers, the volume foot control and the power supply. This arrangement is for the usual cable connection.

FIG. 4 is an alternate schematic diagram similar to FIG. 3 but showing the radio frequency generator and the radio receiving set.

FIG. 5 is a schematic diagram of one of the oscillators and its four divider circuits. Twelve of these circuits are required.

FIG. 6 is a detailed schematic diagram of connections of the bistable multivibrator divider circuit shown in block form in FIG. 5.

FIG. 7 is a detailed schematic diagram of connections of the vibrato oscillator used to provide low frequency modulation of the tone oscillators.

FIG. 8 is a schematic diagram of connections of the bass control circuit, showing the volume and chord switches.

FIG. 9 is a schematic diagram of connections of some of the voicing filter circuits and their preamplifiers. In this diagram the two microphones and the microphone preamplifier are also shown.

FIG. 10 is a block diagram showing how the circuits of FIGS. 11 and 12 are to be joined.

FIGS. 11 and 12 are diagrams of the circuits which include the under key switches and show how the tonal frequencies can be combined and how the frequency range can be changed.

Figure 13:
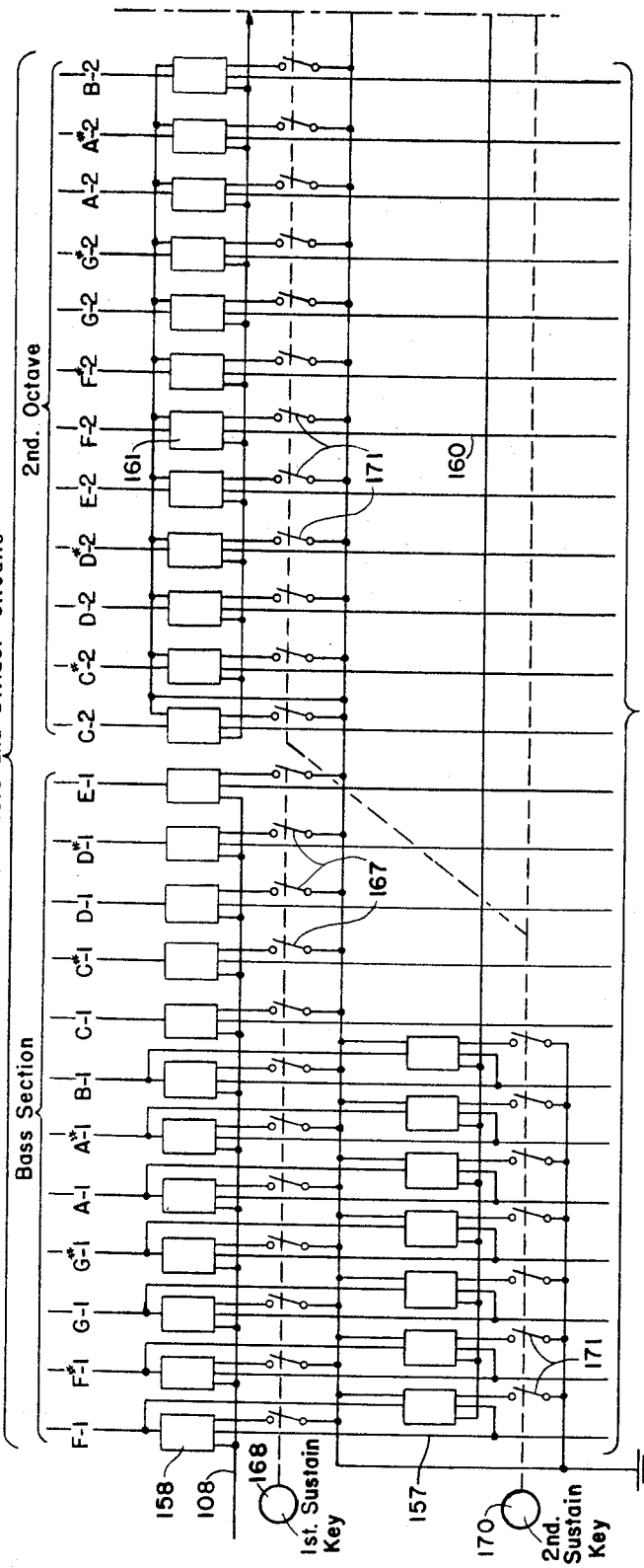
Figure 14:
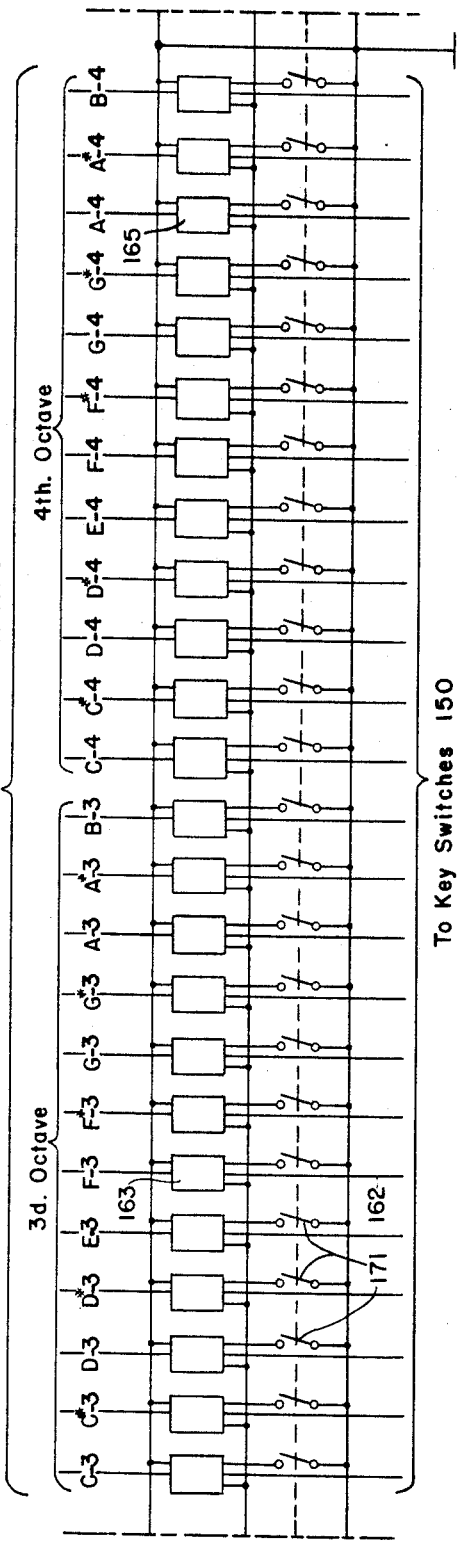
Figure 15:
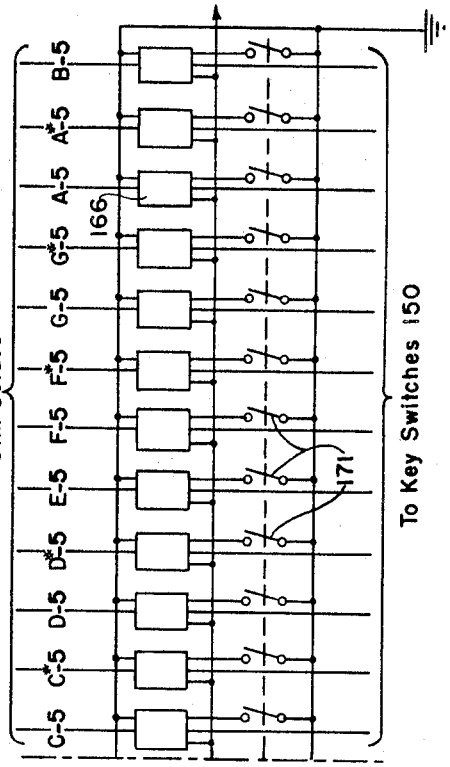

FIGS. 13, 14, and 15, when taken together, form a schematic diagram of all the sustain circuits and indicate their control means.

FIG. 16 is a detailed schematic diagram showing how the bass sustain circuits are constructed and how they are connected to other parts of the accordion arrangement.

Figure 17:
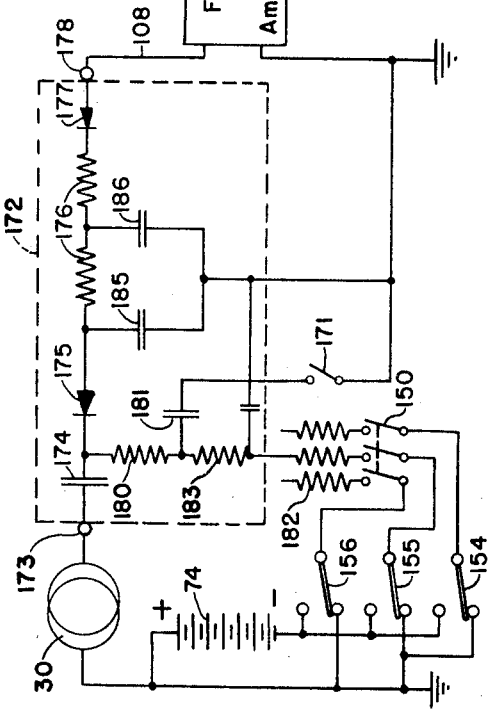

FIG. 17 is a schematic diagram similar to FIG. 16 but showing the components and connections in the remainder of the sustain circuits coupled to the tone generators which produce tones in the second, third, fourth, and fifth octaves.

Figure 1:
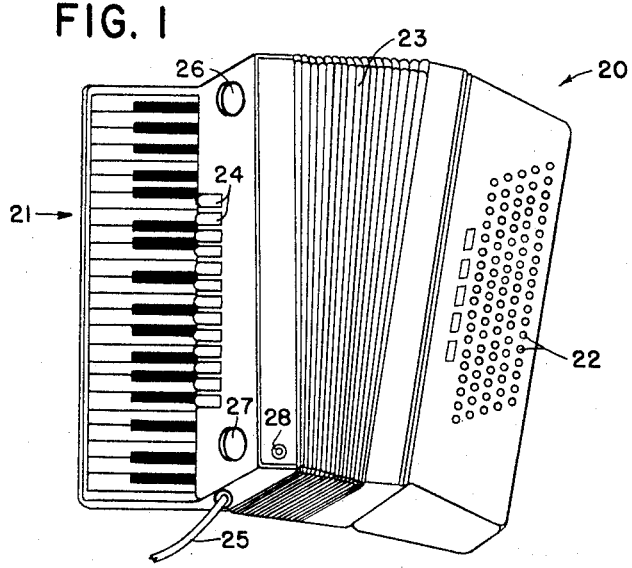
FIG. 1 is a side view of the accordion case showing the right and left hand keyboards, some of the voicing keys and the microphones.
Figure 2:
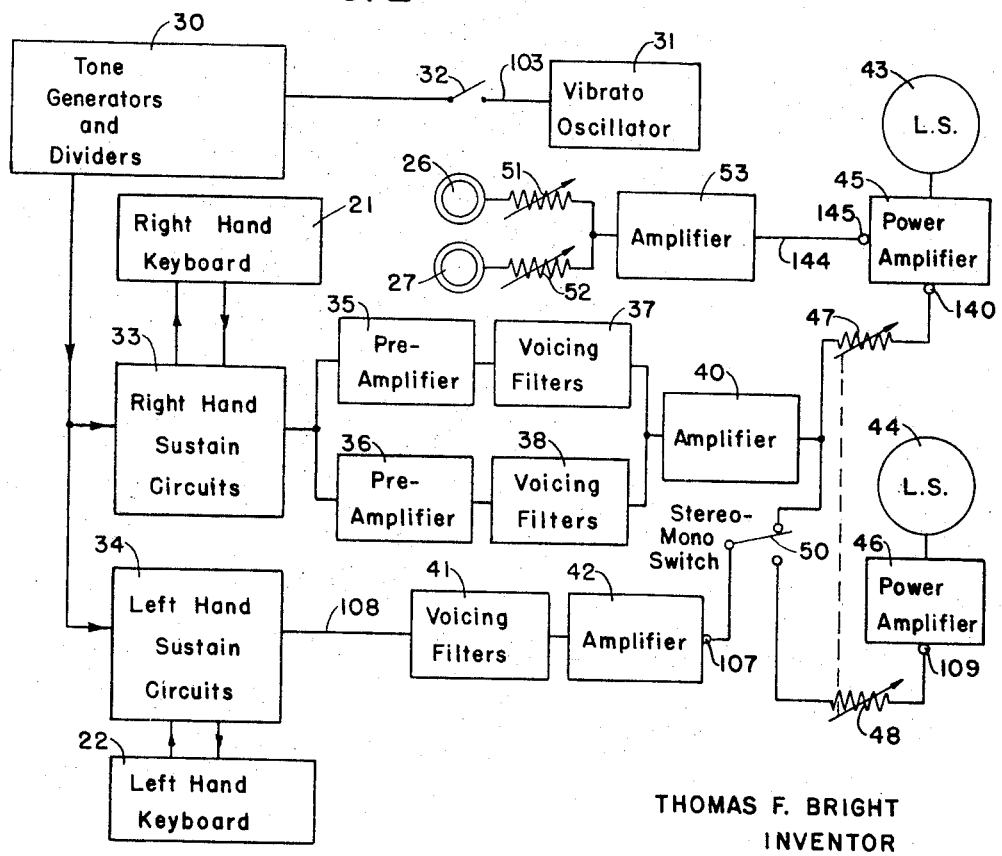
FIG. 2 is a schematic diagram of connections showing all the major components in block.

Referring now to FIGS. 1 and 2, the electrical accordion will be described in a general manner without reference to specific details. Both the reed organ and the electrical organ are housed in the usual accordion box 20. This box includes a right hand keyboard 21, a left hand keyboard 22 and the usual bellows 23 which is not used when the electrical circuits are employed. Box 20 also includes a plurality of voicing switches 24 which are employed to alter the total quality of the sound produced. Other switches and control buttons are available to the operator and will be described when the specific details are described.

In order to provide power for the electrical circuits and to conduct the generated frequencies from box 20 to a loud speaker, a cable 25 is employed. The box also houses two microphones 26 and 27 and a jack 28 is available for plugging in a third microphone.

The general circuit arrangement is shown in FIG. 2 with most of the components shown in block form. A series of twelve tone generators 30 are provided for generating frequencies corresponding to the notes in the highest octave. These generators are each connected to four divider circuits connected in series arrangement for generating all the other lower frequencies. A vibrato oscillator 31 is connected by a switch 32 to the tone generators. This oscillator modulates all the generators at a slow or slightly faster speed, generally within the range of one to ten cycles per second to produce a slight change in frequency. The output of the tone generators and the dividers are applied to two groups of sustain circuits 33 and 34 which permit the volume of the tone output to decay in a logarithmetic manner to simulate the usual volume decay produced by the reed organ. The sustain circuits and their incorporation into the complete circuit represents one of the novel features of the invention. The right hand keyboard 21 is connected to the right hand sustain circuits and this keyboard controls the transmission of the tone frequencies whether sustain circuits are used or not. The left hand sustain circuits are connected in a similar manner and are controlled by the left hand keyboard 22. Again, the left hand keyboard controls the transmission of the tone frequencies whether the sustain circuits are employed or not.

The output of the right hand sustain circuits 33 can be directed through a single set of filters and then amplified for a loud speaker transducer. However, it has been found that the tonal quality of the output is considerably improved if two preamplifier circuits 35 and 36 are employed to transmit two specified ranges to two filter circuits 37 and 38 before being joined to an output amplifier circuit 40. The left hand sustain circuits do not cover the same wide frequency range of the right hand keyboard so a single filtering circuit 41 and a single amplifier circuit 42 is used to couple the sustain circuits to the output sound transducers.

One of the preferred arrangements for broadcasting the sounds generated by the electric accordion is to use two loud speaker transducers 43 and 44, each with its power amplifier circuit 45 and 46, and each with a volume control 47 and 48. It has been found that a pleasing reproduction of generated frequencies may be produced by channeling the frequencies from the left or bass notes through one power amplifier 46 and loud speaker 44 and then channeling the frequencies controlled by the right hand keyboard to power amplifier 45 and loud speaker 43. This results in a stereo effect, especially if the loud speakers are separated by a considerable distance. A stereo-mono switch 50 is provided for shifting the outputs from the two loud speakers, as shown in FIG. 2, to a single loud speaker 43.

There may be times when the operator of the accordion may wish to make an announcement or to sing and have his voice reproduced by the same loud speaker 43 used to reproduce the higher range of tonal frequencies. For this purpose, the microphones 26 and 27 are connected through volume resistors 51 and 52 and applied to a microphone amplifier 53. The output of amplifier 53 is applied to power amplifier 45 and the loud speaker 43.

Referring now to FIG. 3, the accordion 20 is shown with its output cable 25 and a foot control volume adjustment 54. A second cable connects the foot control and other conductors to the power amplifiers and loud speakers 56, all of these circuits being connected to a power supply 57 and a plug 58 which is to be connected to the usual source of alternating current. The details of the power supply are not shown since such a circuit is old in the art and has been described in many prior publications. One feature of this power supply includes a rectifier circuit which supplies a direct current of seventeen volts to all the circuits within the accordion.

The circuit shown in FIG. 3 requires a cable 25 and a foot control 54. These components limit the freedom of the operator and he cannot move about in the usual unrestricted manner of an operator playing a reed accordion. The arrangement shown in FIG. 4 includes the accordion 20, a portable battery 60, and a radio frequency generator 61 with a short wave antenna 62. The generator 61 is small and has reduced power and the battery 60 is also small and light weight. These components together with the antenna 62 are all secured to the accordion box 20 and may be carried by an operator around a room or other playing area. The modulated radio waves transmitted by the antenna 62 are picked up by a similar antenna 63 and radio frequency receiver 64 which are connected by a cable 65 to a power amplifier 56 similar to the power amplifiers and loud speakers shown in FIG. 3.

Referring now to the more detailed description of the circuits and their components, FIG. 5 shows a transistor oscillator 66 which includes a transistor 67, an oscillator coil 68, and a capacitor 70. In the circuit shown, a resistor-capacitor combination 71 is employed to produce a base bias for the transistor 67, the base also being connected through a resistor 72 to the vibrato oscillator circuit by means of terminal 73. The power supply 74 is shown in FIG. 5 as a battery but it may be any other convenient source of direct current.

Only one oscillator circuit is shown in FIG. 5. There are actually twelve of these circuits, one for each of the notes in the highest octave. The output of each oscillator is applied over an output conductor 69 to a plurality of divider circuits 75. Each divider circuit includes a bistable multivibrator circuit arrangement which is controlled by the oscillator 66 to produce a square-topped wave having many harmonics. The output terminals of the oscillator are first applied to input terminals 3 and 2 over conductors 76 and 77. Each time a negative portion of the wave from oscillator 66 is applied to the first divider circuit 78, conductance is shifted from one transistor 80 to the other transistor 81 (FIG. 6). The next negative cycle shifts conductance back to the original condition, this operation producing a square-topped wave at terminals 5 and 3 and thereby applying the square-topped waves to the next divider circuit 82 over conductors 83 and 84. The second divider circuit 82 divides the frequency in a similar manner and applies it to the third divider circuit 85. The fourth divider circuit 86 is controlled in a similar manner.

A second output terminal 6 (FIG. 6) applies square-topped voltages from the first divider circuit 78 to an output terminal 87 which is used to provide one of the frequencies for the fourth octave. The highest octave is supplied directly from oscillator 66, over conductor 69, through a capacitor 88, and a resistor 90 to terminal 89. The third divider circuit 82 is connected directly to terminal 91 to provide tones for the third octave. Divider circuits 85 and 86 have their number 6 terminal connected to terminals 92 and 93 for the second and first octaves. The other output terminal for all these tone outputs is the grounded conductor 94. The divider circuit shown in detail in FIG. 6 need not be described further because this bistable multivibrator is old in the art and has been described in books and other publications. For the organ as described, four divider circuits are required for each oscillator, and twelve oscillator circuits, representing each note in an octave. Since the divider circuits each handle discrete frequencies, 48 of them are required.

The vibrato oscillator shown in FIG. 7 includes an oscillating circuit 94 and amplifier circuit 95. Transistors 96 are connected to a capacitor-resistor twin feedback circuit 97 which produces a frequency of about three cycles per second when a switch arm 98 is connected to a slow speed resistor 100 and produces a faster modulating frequency, of about six cycles per second when switch arm 98 is moved to connect with the other resistor 101. This circuit may be modified to produce any vibrato speed by changing the value of resistors 100 and 101. The output of this oscillator circuit is connected between the grounded conductor 102 and an output terminal 103. The volume of this circuit may be increased by operating switch 104. As explained above, this modulating oscillator is connected by closing switch 32 (FIG. 2) and the result is a slightly wavering tone on all output frequencies. The transistor in amplifier circuit 95 is connected in the usual manner.

The circuit shown in FIG. 8 includes four control switches and an output amplifier circuit 42 including transistor 106. This circuit is used to control the bass tones and is shown in FIG. 2 as circuits 41 and 42. The circuit is supplied with electric power by battery 74. The output is applied to terminal 107 which is connected to the stereo-mono switch 50 and the loud speakers 43 and 44. The base control frequencies are derived from the left hand sustain circuits 34 over conductor 108 which is connected to the volume switch 110. The volume switch 110 connects a resistor 113 in parallel with a similar resistor 112. The on-off switch 111 is in series with the output line which is connected to terminal 107. The frequencies controlled by the left hand keyboard may be altered by another volume switch 115 and controlled by an on-off chord switch 114. These switches are connected in series with conductor 116 and the bass keying circuits. Tone frequencies from this source are applied to capacitor array 109 and then added to amplifiers 41 and 42.

Referring again to FIG. 2, the right hand sustain circuits 33 are connected to preamplifier circuits 35 and 36 and the filter circuits 37 and 38. There may be a large number of these circuits depending upon the tonal qualities desired. In FIG. 9 several of these circuits are shown. Terminals 120 are connected to the right hand sustain circuits 33 and include a preamplifier stage 35 and a filter 37 which may be added to the circuit by the closing of switch 121. The amplifier stages are conventional while the filter circuit includes a series capacitor 122, a resistor divider circuit 123, and a second capacitor 124. This filter circuit produces tones having many high frequency components. The resistor and capacitor values may be varied to produce many tonal qualities.

The second circuit 36 shown in FIG. 9 has input terminals 125 and again includes preamplifier stages 126 and filter circuits 38. The output circuit connected to the collector electrode of transistor 127 includes a capacitor 128 and an inductor 130 connected to a switch arm 131. When this arm is thrown down, as shown in FIG. 9, it produces tonal qualities which are predominantly rich in low frequencies. When the switch is thrown up, a capacitor 132 is switched into the circuit and the frequency range is altered so that only a few frequencies are transmitted. Other tonal voicing switches 133 and 134 are provided to give additional tonal qualities. The output currents from circuits 37 and 38 are collected on conductor 135 and applied to the base of transistor 136 in series with a blocking capacitor 137. Transistor 136, plus its associated circuitry, is amplifier circuit 40 (see FIG. 2) and its output circuit is connected to the collector of transistor 136 in series with capacitor 138. Output terminal 140 is connected in series with a volume control arrangement 47 and capacitor 138. As shown in FIG. 2, terminal 140 is connected to power amplifier 45.

As mentioned previously, it is desirable to provide one or two microphones so that the operator of the organ may make announcements or sing along with the organ music. The details of the microphone circuit are shown at the bottom of FIG. 9 where each is provided with a resistor volume control 141 and 142. These circuits are connected directly to the base of a transistor amplifier component 143 having the usual supply circuits. The collector electrode is connected to an output conductor 144 in series with a blocking capacitor 145. The stereo-mono switch 50 shown in FIG. 2 is again shown in FIG. 9 to indicate the details of its connections. Output terminal 145 is connected to power amplifier 45 (see FIG. 2).

Figure 12:
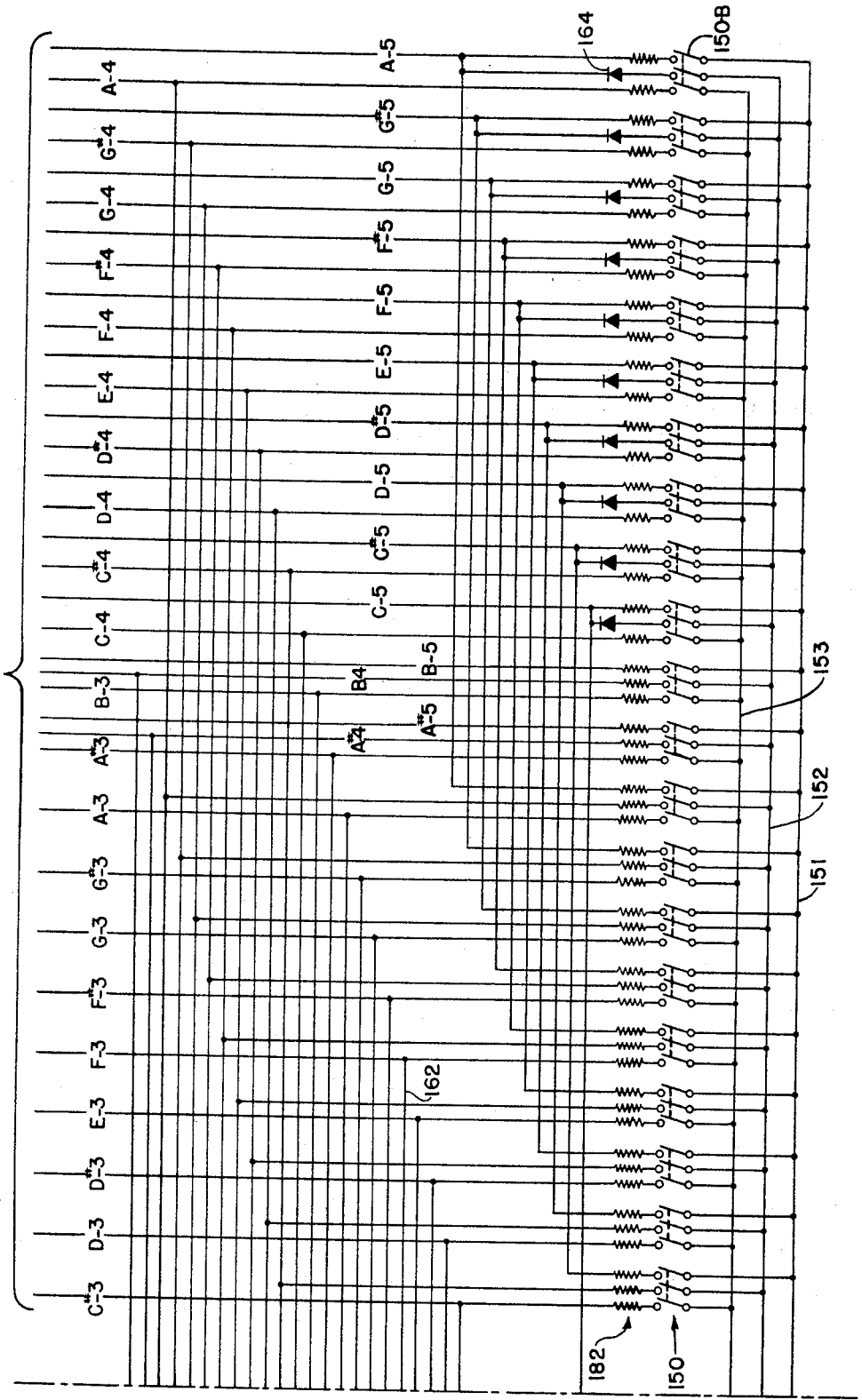

Referring now to FIGS. 11 and 12, the under key switches 150 are connected to three main conductors 151, 152, and 153. Conductor 151 is connected to switch 154 which in its normally or unactuated position is connected to ground. In a similar manner conductor 152 is connected through switch 155 to ground and conductor 153 is connected through switch 156. When either one of the switches 154, 155, or 156, are thrown to the upper position as shown in FIG. 11, seventeen volts is connected to the switch conductors. If switch 156 is moved to its upper position and the first key 150–A is depressed by the operator, then seventeen volts is connected to conductor 157 which runs only to the first sustain circuit 158 (FIG. 13). This conductor connects the lowest sustain circuit 158 (FIG. 13) associated with the lowest frequency F–1 in the bass section. If switch 156 is in its normal position, and switch 155 is moved to its upper or actuated position, then the negative terminal of battery 74 is connected to conductor 152 and through the middle portion of switch 150–A to conductor 160 which is in turn, connected to sustain circuit 161. The tone generator and divider circuits which produce a frequency wave one octave higher and designated by note F–2, are now activated. In a similar manner, actuation of switch 154 sends current from battery 74 through the right hand switch blade 150A to conductor 162 (FIGS. 11 and 12) to send current to sustain circuit 163 in the third octave (FIG. 14) and its associated second divider circuit. The use of switches 154, 155, and 156, permits a player to select three ranges of notes in a single keyboard. Any one, two, or all three switches may be activated.

All the other keys in group 150 are connected in a similar manner except the last ten switches shown in FIG. 12, connected to third octave generators, because the third blade of the tone switch is joined to the second blade in series with an isolating diode rectifier 164. For example, the last or highest key 150–B connects switches 156 and 155 to sustain circuits 165 in the fourth octave and sustain circuit 166 in the fifth octave.

The twelve left hand sustain circuits 34 are shown in detail in FIG. 16, this unit comprising the bass section. The sustain circuits are all put into operation by closing a plurality of switches 167 which are all connected to a key 168. A similar sustain key 170 (FIG. 13) controls all the sustain switches 171, some of which are in the first octave but most of them being in the other higher octaves.

All the bass sustain circuits are the same and are shown in FIG. 16, the actual sustain circuit components being shown within the dashed line 172. Each of the bass sustain circuits includes a first terminal 173 which connects with the tone generator 30 or the divider circuit having the required frequency. A blocking capacitor 174 is connected in series with terminal 173 and also in series connection are a first diode rectifier 175, a resistor 176, and an isolating diode rectifier 177. The output terminals of each of these circuits are connected to a bass buss 108 which is connected to the input terminal of amplifier 42. A resistor 180 has one of its terminals connected to the junction point of capacitor 174 and diode 175 while the other terminal is connected to a chargeable capacitor 181 which assumes a charge from battery 74 each time an under-key switch 50 is closed. The charging of this capacitor is obviously dependent upon the closing of sustain switches 167. The charge circuit includes battery 74, switch 150, resistor 182, resistor 183, capacitor 181, sustain switch 167, and conductor 184 to the other side of the battery.

The operation of this circuit is as follows: when the tone switches 150 and the sustain switch 167 are both open, the frequency waves applied to terminal 173 cannot get through to output terminal 178 because the cathode of rectifier 175 is at the same potential as the anode and the applied frequency wave does not have sufficient amplitude to produce any current through the rectifier. When the sustain switch 167 is open and the tone switch 150 is closed, current from battery 74 applies a negative bias to the cathode of rectifier 175 and conduction is permitted from the tone generator to amplifier 42. As soon as the tone switch 150 is opened, the previous zero bias is applied to the rectifier and the frequency wave from generator 30 is cut off abruptly.

When the sustain switch 167 is closed and tone switch 150 is closed, the same bias is applied to rectifier 175 causing it to conduct, but at the same time capacitor 181 is charged to the full potential of battery 74. When switch 150 is opened, the charge on capacitor 181 retains the negative bias on rectifier 175 for a short time interval, the charging voltage being decreased in a logarithmic manner and the volume transmitted to amplifier 42 is reduced in a similar manner. The decay of the tone amplitude may comprise a time interval of only a few tenths of a second but it produces a more natural tone which is similar to the tone produced by a reed-type organ or a pipe organ.

The sustain circuit shown in FIG. 17 is the circuit used in the second, third, fourth, and fifth octaves and includes the same components except that two additional capacitors 185 and 186 have been added. These capacitors are connected between the ground terminal and portions of the rectifier circuit which connects input terminal 173 to output terminal 187 and amplifier 40. These capacitors cut down some of the high frequencies in the transmitted waves and produce a more pleasing tone. The action of this circuit is the same as that described above in connection with FIG. 16. It is obvious that the time interval for the tone decay can be adjusted by changing the size of capacitor 181 and the value of resistor 176.

From the above description it is obvious that a novel and useful circuit arrangement has been produced which can take the place of a reed organ or accordion and produce music from a set of loud speakers having unusual ranges of volume and musical effects.

The foregoing disclosure and drawings are merely illustrative of the principles of this invention and are not to be interpreted in a limiting sense. The only limitations are to be determined from the scope of the appended claims.

I claim:

1. An electric organ comprising: an accordion box and bellows enclosing a plurality of reeds for generating audible tones; said box also enclosing a plurality of tone generators, each including an oscillator and each adjusted for generating a frequency wave corresponding to one of twelve notes in an octave; a plurality of divider circuits coupled to said tone generators for producing frequencies corresponding to notes in octaves of lower frequencies; a plurality of sustain circuits, each including a diode rectifier, coupled to said generators for sustaining the frequency voltage in a predetermined decaying manner after a biasing voltage has been removed from the diodes; a plurality of keys for operation by a player for transmitting frequency waves having a desired pitch through said sustain circuits; a plurality of switches, one for each key, for connecting all of said sustain circuits to a biasing potential; an output amplifier connected to all of said sustain circuits for amplifying the selected frequency waves; and a loud speaker transducer coupled to said amplifier for converting the frequency waves into sound.

2. An electric organ as claimed in claim 1 wherein said rectifiers each have a cathode and an anode and wherein said sustain circuits each include a chargeable capacitor which is coupled to a source of direct current potential and to the cathode of said diode, said capacitor adapted to be charged when its associated tone switch is closed, said capacitor adapted to discharge at a predetermined rate when the tone switch is open to render the diode nonconductive.

3. An electric organ for an accordion as claimed in claim 1 wherein the output amplifier is connected to a radio frequency generator and an antenna is coupled to the generator for broadcasting to a radio receiving circuit.

4. An electric organ as claimed in claim 1 wherein a plurality of filter-amplifier circuits are employed to select and amplify desired harmonics in the generated wave, said filter circuits being connected between the sustain circuits and said loud speaker transducer.

5. An electric organ is claimed in claim 1 wherein said sustain circuits are divided into two groups, one of the groups of sustain circuits coupled to a keyboard for operation by the right hand of a player and the other group coupled to a keyboard for operation by the left hand of the player.

6. An electric organ as claimed in claim 1 wherein a vibrato oscillator is adjusted for generating alternating current power within the range of two to twenty cycles per second and wherein said power is applied to all the tone generating circuits for modulating the frequency of the output currents.

7. An electric organ as claimed in claim 1 wherein at least one microphone is mounted in the accordion case and is coupled to a common amplifier for amplifying tone frequencies and applying them to a loud speaker transducer.

8. An electric organ as claimed in claim 1 wherein two loud speaker transducers are employed, one for the tone frequencies generated when the keys in the left hand keyboard are actuated and the other for the tone frequencies generated when the keys in the right hand keyboard are actuated.

9. An electric organ as claimed in claim 1 wherein each of said keyboard switches includes three movable blades, one for a bass note, a second for a note one octave higher and a third for a note two octaves higher.

References Cited

UNITED STATES PATENTS

| | | | |
|---|---|---|---|
| 2,811,069 | 10/1957 | Faulkner | 84—1.01 |
| 2,821,879 | 2/1958 | Sano | 84—1.04 |
| 2,983,178 | 5/1961 | Searles et al. | 84—1.04 X |
| 3,085,460 | 4/1963 | Edwards | 84—1.16 X |
| 3,291,886 | 12/1966 | Tinker | 84—1.26 X |

FOREIGN PATENTS 761,127 11/1956 Great Britain.

ARTHUR GAUSS, *Primary Examiner.*

D. D. FORRER, *Assistant Examiner.*